US012505713B2

(12) United States Patent
Vonaesch

(10) Patent No.: US 12,505,713 B2
(45) Date of Patent: Dec. 23, 2025

(54) BUILDING DOOR SYSTEM WITH OPERATING AND WAYFINDING DEVICES

(71) Applicant: Inventio AG, Hergiswil (CH)

(72) Inventor: Jonas Vonaesch, Lucerne (CH)

(73) Assignee: Inventio AG, Hergiswil (CH)

( * ) Notice: Subject to any disclaimer, the term of this patent is extended or adjusted under 35 U.S.C. 154(b) by 89 days.

(21) Appl. No.: 18/695,758

(22) PCT Filed: Sep. 1, 2022

(86) PCT No.: PCT/EP2022/074344
§ 371 (c)(1),
(2) Date: Mar. 26, 2024

(87) PCT Pub. No.: WO2023/052031
PCT Pub. Date: Apr. 6, 2023

(65) Prior Publication Data
US 2025/0131784 A1 Apr. 24, 2025

(30) Foreign Application Priority Data
Sep. 30, 2021 (EP) ..................................... 21200196

(51) Int. Cl.
*G07C 9/22* (2020.01)
*G07C 9/27* (2020.01)

(52) U.S. Cl.
CPC ..................................... *G07C 9/22* (2020.01); *G07C 9/27* (2020.01)

(58) Field of Classification Search
CPC ......... G07C 9/22; G07C 9/27; G07C 9/00904
See application file for complete search history.

(56) References Cited

U.S. PATENT DOCUMENTS

2011/0084799 A1 4/2011 Ficko
2020/0372743 A1 11/2020 Miller et al.
(Continued)

FOREIGN PATENT DOCUMENTS

CN 108320752 A 7/2018
CN 109830022 A 5/2019
(Continued)

OTHER PUBLICATIONS

International Search Report issued in application No. PCT/EP2022/074344 on Nov. 28, 2022.

*Primary Examiner* — Nabil H Syed
(74) *Attorney, Agent, or Firm* — Knobbe, Martens, Olson & Bear, LLP

(57) ABSTRACT

A building door system has operating and wayfinding devices, wherein each of the operating and wayfinding devices is assigned to a respective single-door system and can be connected to one another for communication with a communications network. Each operating and wayfinding device has a storage device storing an identifier, a control and processing device, a recognition device for detecting a credential of a person, and a display device, which has a user interface facing outdoors. When an invalid credential for the single-door system is detected, the control and processing device generates a request signal containing data of the credential and the individual identifier and feeds this into the communications network. The control and processing device receives a response signal via the communications network, extracts wayfinding information contained in the response signal and assigned to the credential, and activates the display device to display the wayfinding information on the user interface.

19 Claims, 3 Drawing Sheets

(56) References Cited

U.S. PATENT DOCUMENTS

| | | | | |
|---|---|---|---|---|
| 2021/0158664 | A1* | 5/2021 | Correnti | G07C 9/38 |
| 2022/0020238 | A1* | 1/2022 | Arulanandan | G07C 9/00904 |
| 2022/0060851 | A1* | 2/2022 | Norimatsu | G06V 20/52 |
| 2022/0248169 | A1* | 8/2022 | Bettua | G08B 25/10 |
| 2022/0383681 | A1* | 12/2022 | Dallimore | G07C 9/00896 |

FOREIGN PATENT DOCUMENTS

| | | | |
|---|---|---|---|
| EP | 3550528 | A1 | 10/2019 |
| WO | WO 2019121335 | A1 | 6/2019 |

* cited by examiner

BUILDING DOOR SYSTEM WITH OPERATING AND WAYFINDING DEVICES

TECHNICAL FIELD

The technology described here generally relates to a building door system for a building. Exemplary embodiments of the technology also relate to a method for operating the building door system.

SUMMARY

Doors for buildings can be designed in a wide variety of manners to grant or deny persons access to a building and/or an access-restricted zone in the building. The design of a building door can affect the way in which persons are granted or denied access, for example, with a swing door or a sliding door. A single-action door has a movable door leaf that is fastened to the door frame (frame, door lining) with two or more hinges (door hinges). EP2876241B1, for example, describes a sliding door system in which a sliding door in a frame structure can be moved between a closed position and an open position. In the closed position, the sliding door is flush with the wall surrounding it, and in the open position, a recess in the wall receives the sliding door at least partially.

These doors can be locked and unlocked in the usual manner. It is known, for example, that an electronic lock is arranged on a swing door, on which a credential (e.g., access code, chip or magnetic stripe card) may be entered such that the door can be unlocked and opened. WO2020/126483A1 discloses a detection device which is arranged, for example, on a sliding door system. A credential presented by a user and detected by the detection device can then be checked for validity. The detection device may comprise, for example, a transmitting and receiving device for radio signals, a detection device for a biometric feature, a detection device for an optical code, a reader for a chip or magnetic stripe card, or a keypad or touch-sensitive screen for manually entering an access code, or a mechanical or electronic door lock.

The building doors mentioned relate to different requirements, for example a sliding door takes up less space than a swing door and an electronic detection device can offer greater security and convenience than a conventional door key. In addition to these requirements, there are other demands, for example due to changing lifestyles or living conditions (e.g., denser living in apartments in a city), including a need for increased security and increasing automation of and in buildings. There is therefore a need for a technology that meets one or more of these requirements in full or in part, wherein the need for security and user-friendliness in particular must be improved.

One aspect of the present disclosure relates to a building door system that can have multiple operating and wayfinding devices, each of which is associated with a single-door system and can be communicatively connected to one another via a communications network. Each operating and wayfinding device can have a storage device in which an identifier of the operating and wayfinding device is stored, and a control and processing device which is connected to the storage device. In addition, a detection device communicatively connected to the control and processing device can be provided for detecting a person's credential, wherein the single-door system may release access if the credential is valid at this single-door system. A display device can be communicatively connected to the control and processing device and can have a user interface facing an external space, which can be viewed by a person located in the external space. The control and processing device can be designed to generate a request signal with data from the credential and the identifier when a credential is detected that is invalid at the single-door system and to feed it into the communications network, to receive a response signal via the communications network and to extract wayfinding information contained in the response signal and assigned to the credential. The control and processing device can also be designed to control the display device to display the wayfinding information on the user interface.

Another aspect of the present disclosure relates to a method of operating the building door system. A person's credential can be detected by a detection device of an operating and wayfinding device of a single-door system, wherein the credential is invalid at the single-door system. A request signal may be generated by a control and processing device of the operating and wayfinding device, wherein the request signal comprises data of the notification credential and an identifier of the single-door system. The request signal can be fed into the communications network by the control and processing device; a response signal can also be received via the communications network by the control and processing device. The wayfinding information contained in the response signal and assigned to the credential may be extracted by the control and processing device, which also controls a display device of the operating and wayfinding device to display the wayfinding information on a user interface of the display device.

The disclosure described herein creates a building door system in which existing requirements in terms of security and user-friendliness are improved in a building. A person can contact virtually any operating and wayfinding device installed in the building to obtain wayfinding information, particularly if the credential is not valid at this operating and wayfinding device or for its environment. Instead of simply informing the person that the credential is not valid here, the person may be helped by the communication of the wayfinding information; in a spacious building, for example, the person does not have to go to a central reception desk or wander around the building alone (e.g., at night). A person skilled in the art recognizes that the wayfinding information can be communicated visibly and/or audibly.

The present disclosure also offers the advantage that it can be used from an outdoor space as well as an interior space. From the outdoor space, a person who makes a mistake at a building door (e.g., hotel room door), for example, may be communicated the "correct" room number as wayfinding information, e.g., it is displayed. Similarly, wayfinding information may be communicated when the person enters a destination on the operating and wayfinding device from an interior space and requires wayfinding information on the way to the destination.

In some embodiments, the building door system can comprise multiple individual door systems whose operating and wayfinding devices, among other things, can be communicatively coupled to the communications network. Each individual door system can have a frame that can be installed in a building wall and a door element arranged movably therein, which in an open state releases a passage between an outdoor space and an interior space and in a closed state blocks the passage, and a closing device that is communicatively connected to the control and processing device. In this exemplary embodiment, the individual door systems or their operating and wayfinding devices can be cross-linked with one another via the communications network, so that, for example, communication options also exist between the operating and wayfinding devices.

In some embodiments, an individual door system can have an interface device which is designed to transmit the request signal to further individual door systems via the communications network and to receive the response signal via the communications network from one of the further individual door systems to which the credential is assigned and which determines the wayfinding information. For example, an operating and wayfinding device may send a request signal to one or more operating and wayfinding devices, to which one or more operating and wayfinding devices may respond. The request signal can, for example, query the other operating and wayfinding devices as to which individual door system a presented credential is assigned to or which destination is assigned to this credential. The individual door system in which this assignment information is stored can then transmit the response signal, including its identifier, to the requesting individual door system. This makes it possible, for example, to create a building door system that represents a quasi-closed system in operation, which may require no communication with an external system (in relation to the building door system).

In some embodiments, an individual door system can have an interface device that is designed to transmit the request signal to a building management system via the communications network and to receive the response signal from the building management system via the communications network. The building management system can be designed to determine the wayfinding information. In this exemplary embodiment, the building management system can serve as a central communication node that performs various services for the building door system. In addition to determining the wayfinding information, the building management system can manage the credentials and check their validity as further exemplary services when they may be transmitted by the individual door systems in connection with the request signals. If such a building management system is provided, the building door system can be designed to be less complex.

The disclosure described herein is not limited to a specific type of single-door system. The equipment of a building with a desired single-door system can therefore be selected flexibly. A single-door system can comprise a single-action door, a rotating door or a sliding door, for example. A single-door system can also be designed without a door element, wherein access is monitored with a monitoring device, e.g., a video monitoring device in connection with an alarm device.

There is also flexibility in the design of the building door system or the building with regard to the arrangement of the display device of an operating and wayfinding device. The display device can be arranged on a door element or a frame of a single-door system or on a building wall at a fixed distance from the frame of a single-door system.

In some embodiments, at least one of the operating and wayfinding devices can have a further display device. The further display device can be communicatively connected to the control and processing device and has a user interface facing an interior space, which can be viewed and/or operated by a person located in the interior space. The operating and wayfinding devices can therefore be operated by a person in the outdoor space as well as by a person in the interior space.

In some embodiments, the at least one operating and wayfinding device may have an optical system designed to generate an image of the outdoor space. In some embodiments, the image recording can be displayed on the user interface of the further display device. In some embodiments, the optical system can be used in connection with a door viewer function. In another exemplary embodiment, the optical system can be used in connection with an image processing device as a device for recognizing biometric personal features (e.g., for facial recognition).

If, in an embodiment, an operating and wayfinding device is equipped with a further display device, its storage device can store destinations that can be reached by a person in the building. The control and processing device can be designed to control the further display device to display at least one of these targets for a target input. In some embodiments, the storage device can store the destination input, i.e., the destination that the person selects, for example, before leaving the interior space. This target information can therefore be transmitted by the operating and wayfinding device of this single-door system in connection with a response signal in response to a request signal.

In some embodiments, the control and processing device can be designed to transmit the destination input to an elevator controller via the communications network, to receive an elevator allocation determined by the elevator controller via the communications network and to control the further display device to communicate, e.g., display, the elevator allocation. In this embodiment, the target information can also be transmitted by the operating and wayfinding device of the single-door system in connection with a response signal in response to a request signal. In addition to this, the response signal may comprise the elevator allocation.

Depending on the design of the building, the information regarding the selected destination can also be transmitted to any existing building management system and/or the elevator controller. The destination information can thus be provided by the operating and wayfinding device of this single-door system or the building management system in connection with a response signal in response to a request signal.

The embodiments, features and elements described herein can be combined in various combinations without restrictions, unless expressly stated otherwise. These embodiments, features and elements and their operation and applications will become clearer in the light of the disclosure herein and the accompanying drawings. However, it is understood that the following description and drawings are exemplary in nature and are not intended to be limiting.

BRIEF DESCRIPTION OF THE DRAWINGS

Various aspects of the disclosure are described in greater detail herein in conjunction with the drawings with reference to exemplary embodiments. In the figures, identical elements have identical reference signs. In the drawings.

DETAILED DESCRIPTION

Figure 1:
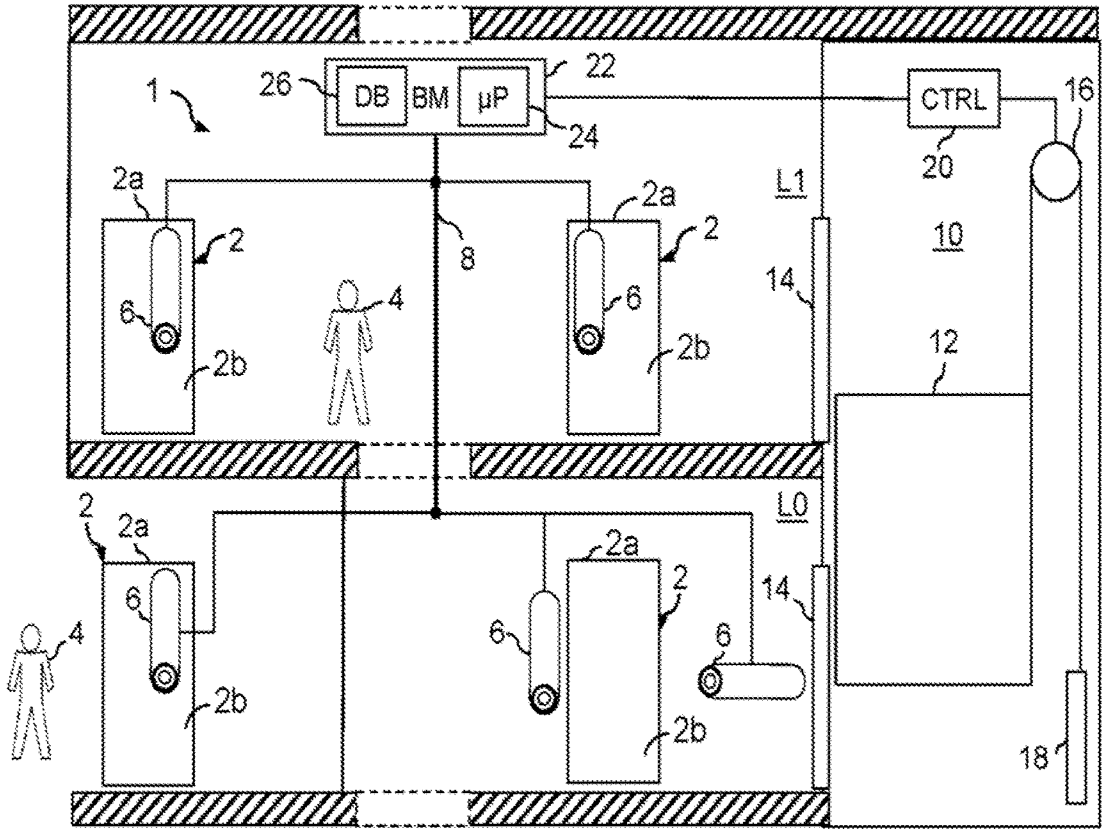
FIG. 1 shows a schematic diagram of an exemplary situation in a building with a building door system in accordance with an exemplary embodiment.

FIG. 1 is a schematic diagram of an exemplary situation in an exemplary building with a building door system 1 and one or more floors L0, L1. The building door system 1 comprises several single-door systems 2. In this description, the term "building" is to be understood as meaning, for example, residential and/or commercial buildings, hotels, hospitals, and other buildings in which persons can stay. If a plurality of floors is present in a building, said floors can be served by an elevator system 10 in a known manner. For illustration purposes, the elevator system 10 in FIG. 1 is shown with an elevator car 12, landing doors 14, a drive device 16, a counterweight 18 and an elevator controller 20.

In FIG. 1, the building has a first floor L0 and an upper floor L1, which can be used by persons 4. To illustrate this, FIG. 1 shows a person 4 outside the building in front of a single-door system 2 (e.g., front door) and a person 4 on floor L1. For example, a person 4 may be authorized to enter the building and one or more spaces in the building; the building door system 1 can block an individual single-door system 2 for a person 4 or release it if access authorization exists. However, person 4 cannot be authorized to access other spaces; the corresponding individual door systems 2 remain locked for them.

FIG. 1 shows two individual door systems 2 on the upper floor L1, which serve as internal doors to the building and through which persons 4 can enter and leave areas or spaces with restricted access behind them. The building and/or individual areas or spaces with restricted access can be managed by a responsible person (e.g., tenant, owner, building management, etc.); the person responsible can grant access authorizations and store them in user profiles, e.g., one user profile per person 4, in which it is specified to which area or space person 4 is authorized to access and, if applicable, at what times. A person skilled in the art will recognize that the building on the first floor L0 may also have one or more individual door systems 2, for example, another front door and/or one or more interior building doors. There may be a sole single-door system 2 or more than two single-door systems 2 on the upper floor L1. The latter can be the case in an office building, hotel or residential building, for example, where individual offices, rooms or apartments can be accessed from a shared corridor.

Each of the exemplary single-door systems 2 shown in FIG. 1 has a frame 2*a*, a door element 2*b* and an electrically controllable closing device 40, 42 (see FIG. 2), with which a single-door system 2 can be opened and closed; depending on the design, the single-door system 2 can be locked and unlocked. In some embodiments, the closing device 40, 42 can be actuated by an electrical control signal. If the single-door system 2 is to be opened for a person 4, the electrical control signal may activate the closing device 40, 42, which unlocks the single-door system 2. Accordingly, in some embodiments, the closing device 40, 42 can be actuated by an electrical control signal in order to lock the single-door system 2. A person skilled in the art will recognize that a single-door system 2 can also be designed without a door element 2*b;* the closing device 40, 42 is not present in this case. Access or passage at the single-door system 2 can then be monitored, for example, with a monitoring device, e.g., a video monitoring device in connection with an alarm device. In the embodiments described herein, the single-door systems 2 are each equipped with the closing device 40, 42, whereby a single-door system 2 can be locked and unlocked.

FIG. 1 also shows operating and wayfinding devices 6 and a communications network 8, which communicatively connects the operating and wayfinding devices 6 with one another. The communications network 8 extends (horizontally) on the floors L0, L1 and (vertically) between the floors L0, L1. The operating and wayfinding devices 6 can be designed in such a manner that components on the user side are each arranged on the frame 2*a,* the door element 2*b* or on a building wall and are accessible there for a person 4, e.g., for operation and/or for the perception of communicated information, e.g., for reading displayed information. In FIG. 1, components of the operating and wayfinding device 6 on the user side are arranged on floor L0, for example on the door element 2*b* of the left single-door system 2 and next to the right single-door system 2; in some embodiments described herein, this is done in such a way that a person 4 perceives them as belonging to the right single-door system 2. In FIG. 1, an operating and wayfinding device 6, or its components on the user side, is also arranged on the floor L0 next to the landing door 14; in an exemplary embodiment, they can be arranged on the landing door 14, for example on a landing door frame.

In some embodiments, depending on the design and organization of the building, there may be a computerized (central) building management system 22 (BM) having a storage device 26 (DB) and a computer system 24 (μP). The building management system 22 may be communicatively connected to the communications network 8 and the elevator controller 20. In FIG. 1, the building management system 22 is shown as an example; in this exemplary embodiment, it can be provided for managing the aforementioned user profiles, checking the access authorizations and controlling the individual single-door systems 2 or their closing device 40, 42. In another exemplary embodiment, there may be no central building management system 22 provided in the building. In this case, the elevator controller 20 can be communicatively connected to the communications network 8 and thus also to the individual operating and wayfinding devices 6. In some embodiments, functionalities of the central building management system 22 can be implemented in the building door system 1 or its single-door systems 2 and/or the operating and wayfinding devices 6. As explained herein, the single-door systems 2 or their operating and wayfinding devices 6 can be cross-linked with one another and equipped with functionalities for information processing, whereby an exchange of information between these system components is possible.

A person skilled in the art will recognize that the building management system 22 may be wholly or partially outsourced to an IT infrastructure for so-called cloud computing (colloquially also referred to as "cloud"). This includes, for example, storing data in a remote data center but also executing programs that are installed remotely rather than locally. In some embodiments, a certain functionality can be made available in the (local) computer system 24 or via the "cloud," for example. For this purpose, a software application or program parts thereof can be executed in the "cloud," for example. The computer system 24 then accesses this infrastructure as required in order to execute the software application.

In FIG. 1, the disclosure described herein can be used in an advantageous manner to operate the building door system 1 with the highest possible level of safety and convenience. Briefly summarized by way of example, if it is detected at one of the operating and wayfinding devices 6, at which the person 4 presents the credential from an outdoor space, that the credential is not valid at this single-door system 2, the person 4 can be communicated wayfinding information by the operating and wayfinding device 6 of this single-door system 2. The communication can take the form of a display and/or a voice message. Instead of simply informing the person 4 that the credential is not valid at this single-door system 2, the person 4 can be helped by the wayfinding information in a hotel, for example, telling them the "correct" room number or the way (e.g., by communicating a floor number and an elevator) to a desired destination (e.g., swimming pool or similar).

This is made possible, among other things, by the operating and wayfinding devices 6, which are cross-linked with one another via the communications network 8. A control and processing device 30 (FIG. 2) of the operating and wayfinding device 6 can generate a request signal with data of the notification credential and an individual identifier of the single-door system 2 and feed it into the communications network 8 in the event of a detected credential that is invalid at this single-door system 2. Another single-door system 2 or the building management system 22 can then generate a response signal and send it via the communications network 8 to the single-door system 2 identified by the single-identifier. The control and processing device 30 can extract the wayfinding information assigned to the credential from the received response signal and, for example, cause it to be displayed with a display device 32 (FIG. 2) of the operating and wayfinding device 6.

In some embodiments, the communications network 8 is designed as a communication bus system. Such bus systems for communication between several units in a building are known to persons skilled in art. The communications network 8 can, for example, be designed as a field bus (e.g., LON bus system (Local Operating Network)). This is a network technology based on the principle of distributed intelligence. All units (nodes) integrated in a LON network each have a freely programmable chip (neuron), which is responsible for the bus connection and the protocol and is also available for application programs. Communication in a LON network takes place independently of a control center. The nodes exchange information directly with one another and can trigger actions at any location and at any participant within the LON network. There is a common communication protocol (LonTalk) for this purpose. In another exemplary embodiment, the communications network 8 can be designed as a BACnet bus system (Building Automation and Control network) or as a KNX bus system.

Figure 2:
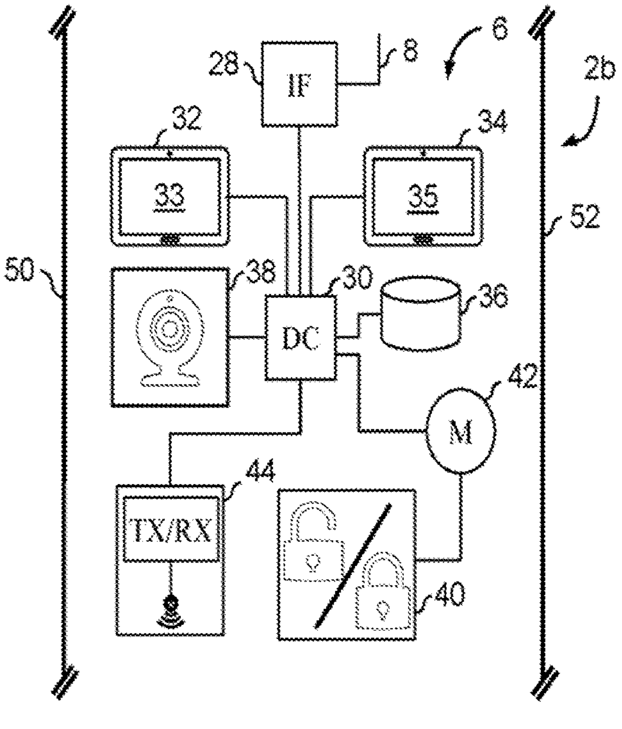
FIG. 2 shows a schematic diagram of an exemplary embodiment of a part of a single-door system with its exemplary components.

As shown in FIG. 2, the single-door system 2 or the operating and wayfinding device 6 assigned to it has an interface device (IF) 28, which can be communicatively connected to the communications network 8. In the exemplary embodiment shown, the aforementioned request signals are transmitted and the response signals are received via the interface device 28. For this purpose, the interface device 28 is also connected to the control and processing device 30.

In addition to the components already mentioned, FIG. 2 shows examples of further components of the operating and wayfinding device 6, in particular a (second) display device 34, a storage device 36, an optical system 38 and a detection device 44, which are connected to the control and processing device 30. In embodiment shown in FIG. 2, these components are arranged on the door element 2*b;* two door leaves 50, 52 of this door element 2*b* are shown in FIG. 2, wherein the door leaf 50 is arranged towards the outdoor space and the door leaf 52 is arranged towards an interior space. A person skilled in the art will recognize that the door element 2*b* can be designed as a single-action door (swing door), a sliding door, a rolling gate, a rotating door or similar. It is also possible to configure the passage as a monitored passage, e.g., without the door element 2*b* or a similar barrier, but also with a device for video surveillance. A person skilled in the art will also recognize that the operating and wayfinding device 6 can be arranged in or on a building wall; in an exemplary lightweight wall made of a double-shell construction of wood or metal (stud frame), which is provided with a planking of plaster or wood, the operating and wayfinding device 6 can be arranged wholly or partially in a hollow space between the planking. With reference to FIG. 2, the reference numerals 50, 52 correspond in this case to the planking.

In some embodiments, the display device 32 can be arranged in such a manner that its display surface (user interface 33) can be viewed and possibly operated from the outdoor space. The display device 32 can, for example, be inserted into a recess in the door leaf 50. If, as shown in FIG. 2, the (second) display device 34 is provided, it can be arranged in such a manner that its display surface (user interface 35) can be viewed and possibly operated from the interior space. The display device 34 can, for example, be inserted into a recess in the door leaf 52.

The optical system 38 shown in FIG. 2 can be used in connection with a door spy function in some embodiments; oriented towards the outdoor space, the optical system 38 can enable a view from the interior space to an area of the outdoor space. The optical system 38 can be designed as an electro-optical (digital) door spy with a digital camera, the images of which can be displayed particularly by the display device 34. The functioning of such a door spy is known topersons skilled in the art. It is also known that the door spy function can be activated manually or automatically (when movement is detected), for example. The door spy function can also be permanently activated.

The detection device 44, which can be communicatively connected to the control and processing device 30, may be designed to recognize a credential, on the basis of which, in some embodiments, a person 4 can prove their access authorization to a door system 2. The credential can, for example, take the form of a physical key, a manually entered password (e.g., a numeric code/PIN code), a biometric personal feature (e.g., fingerprint, iris pattern, speech/voice characteristics or facial features), a code (e.g., access code) captured by a magnetic, chip or RFID card or an electronic device (NFC-, Bluetooth- or mobile phone-based) or an optical code (e.g., barcode, matrix code (e.g., QR code) or color code) displayed on a surface.

In some embodiments, the detection device 44 may comprise the optical system 38. In connection with an image processing device and evaluation of a biometric personal feature (e.g., for facial recognition), the biometric personal feature can serve as a credential in some embodiments.

According to the aforementioned forms that the credential can have, the credential can be presented in different manners, for example, by a deliberate manual action (e.g., entering a PIN code, presenting an optical code or holding out an RFID card) or by approaching the door in order to come within radio range of the detection device 44 (e.g., for the production of an RFID or Bluetooth connection) or within a detection range of the optical system 38. If the credential is valid on a single-door system 2, the control and processing device 30 of this single-door system 2 may control, for example, an actuator 42, which unlocks an electromechanical locking mechanism 40 of the closing device (40, 42). A person skilled in the art will recognize that in some embodiments, it may be possible to open the single-door system 2 without unlocking it first.

The detection device 44 is designed according to the credential provided in the building. That is, in some embodiments the detection device 44 has, for example, a door cylinder, a detection device for a biometric feature, a detection device for an optical code (e.g., bar code, QR code and/or color code (see WO 2015/049186 A1)), a reader for a magnetic stripe card or a chip card, a keyboard or a touch-sensitive screen for manually entering a password, or a transmitter and receiver for radio signals. In some embodiments, the digital camera of the optical system 38 may be used to capture an optical code and/or facial features. The detection device 44 may therefore comprise all or part of the digital camera or its functionality.

A person skilled in the art will recognize that in some embodiments, the detection device 44 may be configured for one or more of these credentials. In an exemplary embodiment in accordance with FIG. 2, the detection device 44 may comprise, for example, a transmitting and receiving device for radio signals (TX/RX) and a digital camera for detecting an optical code or a face. The optical code can be visibly printed on a carrier material or displayed on a display of a mobile phone. In some embodiments, the credential is transmitted by radio, particularly a Bluetooth technology, to the detection device 44.

The storage device 36 is electrically connected to the control and processing device 30. In the exemplary embodiment shown in FIG. 2, the storage device 36 has a storage area for a database and a storage area for one or more computer programs for operating the single-door system 2. In some embodiments, operating the single-door system 2 can comprise processing or forwarding a detected credential, unlocking and locking the closing device 40, 42 (including automatically opening and closing a sliding door), processing or forwarding messages received via the interface device 28, and processing or forwarding commands entered at the display device 34. The computer program can be executed by the control and processing device 24.

In some embodiments, the database may store a data set for a person 4 who is authorized to access a single-door system 2. The stored data set is also referred to herein as the user profile. The user profile can comprise data such as name, credential information (key number, PIN code, access code, biometric data) and any time restrictions (e.g., access from Monday to Friday, from 7:00 a.m. to 8:00 p.m.). If several people are authorized to access the database, the database may store a user profile for each person.

Figures 3A, 3B, 3C:
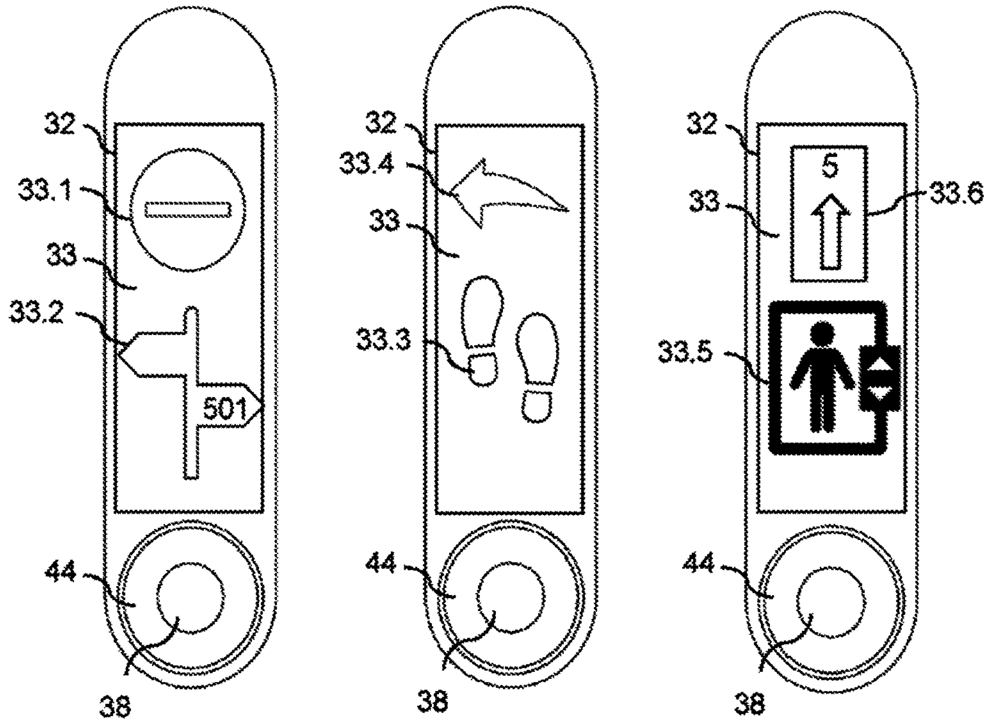
FIGS. 3A-3C show schematic diagrams of exterior side display examples of an exemplary embodiment of a user interface of an operating and wayfinding device of the building door system.
Figure 5:
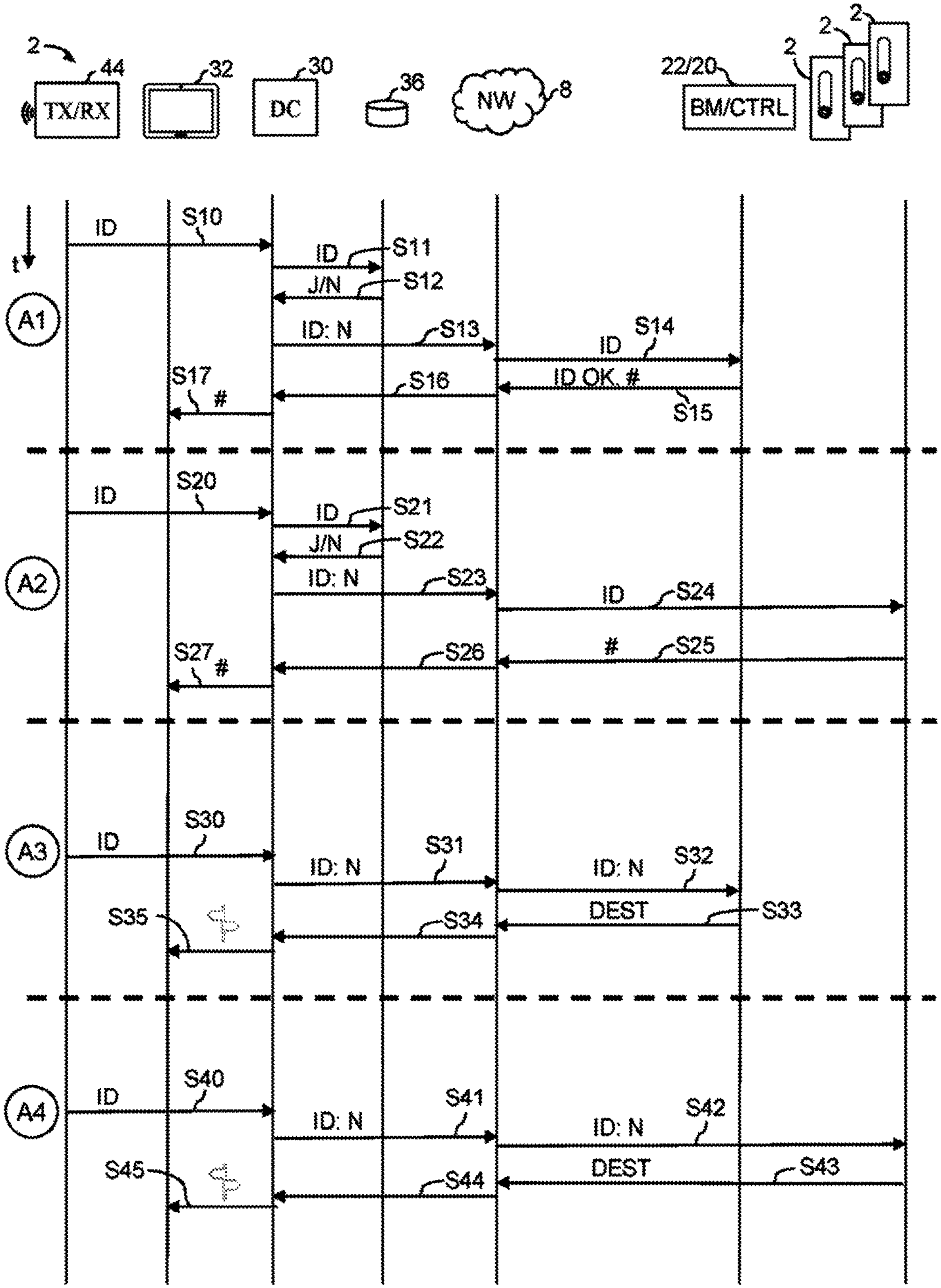
FIG. 5 shows exemplary signal diagrams for different application examples based on a single-door system of the building door system.

With an understanding of the basic system components described above and their functionalities, embodiments of the disclosure are given herein in connection with FIG. 3A-FIG. 3C. Communications taking place via the communications network 8 are shown in FIG. 5. FIG. 3A-FIG. 3C show schematic diagrams of exterior side and user interface 33 display examples of an exemplary embodiment of the display device 32 of the operating and wayfinding device 6. An externally visible part of the display device 32 has an elongate shape (length and width), each shown in a vertical orientation. Each broadside is semi-circular in shape, wherein the detection device 44 and optical system 38 disposed behind it are shown in the lower semi-circular broadside for illustrative purposes. Their presence can be indicated on the user interface 33 (e.g., as shown in FIG. 3A-FIG. 3C with one or more circles and/or lighting (with or without color or lighting effect)); this allows a person 4 to recognize, for example, at which location the credential is to be presented. A person skilled in the art will recognize that a horizontal orientation of the visible part of the display device 32 is also possible and that the visible part can be designed in a different manner, e.g., can have a different shape (e.g., round or oval, with only a semi-circular broad side, etc.).

In these embodiments, a person 4 is located in the outdoor space in the area of a single-door system 2 and can view and operate the operating and wayfinding device 6 from there. In the embodiments shown in FIG. 3A-FIG. 3C, the person 4 is not authorized to access the single-door system 2 but has already shown their credentials there. In FIG. 3A, the user interface 33 therefore indicates the lack of access authorization with a pictogram 33.1 and/or an illumination effect. In addition, the user interface 33 displays a pictogram 33.2 for wayfinding information; in a hotel, for example, a number (501) of the (correct) room assigned to person 4. For example, if person 4 has made a mistake with the room number or forgotten it (because it is not indicated on a card-shaped "room key"), they can then go to "their" hotel room using the displayed wayfinding information. The wayfinding information comprises, for example, the room number, but it can also comprise other information (e.g., floor, direction and/or elevator information).

In FIG. 3B, the user interface 33 displays two pictograms 33.3, 33.4 for wayfinding information. The wayfinding information instructs person 4 to go in the direction indicated by pictogram 33.4 (pictogram 33.3). In FIG. 3C, the user interface 33 also displays two pictograms 33.5, 33.6 for wayfinding information. The wayfinding information instructs person 4 to take an elevator (pictogram 33.5) to the 5th floor (pictogram 33.6). A person skilled in the art will recognize that the type of representation of the wayfinding information is not limited to pictograms (i.e., simplified graphic representations for conveying information) in general, nor to the pictograms (or others) shown and their number.

Figures 4A, 4B:
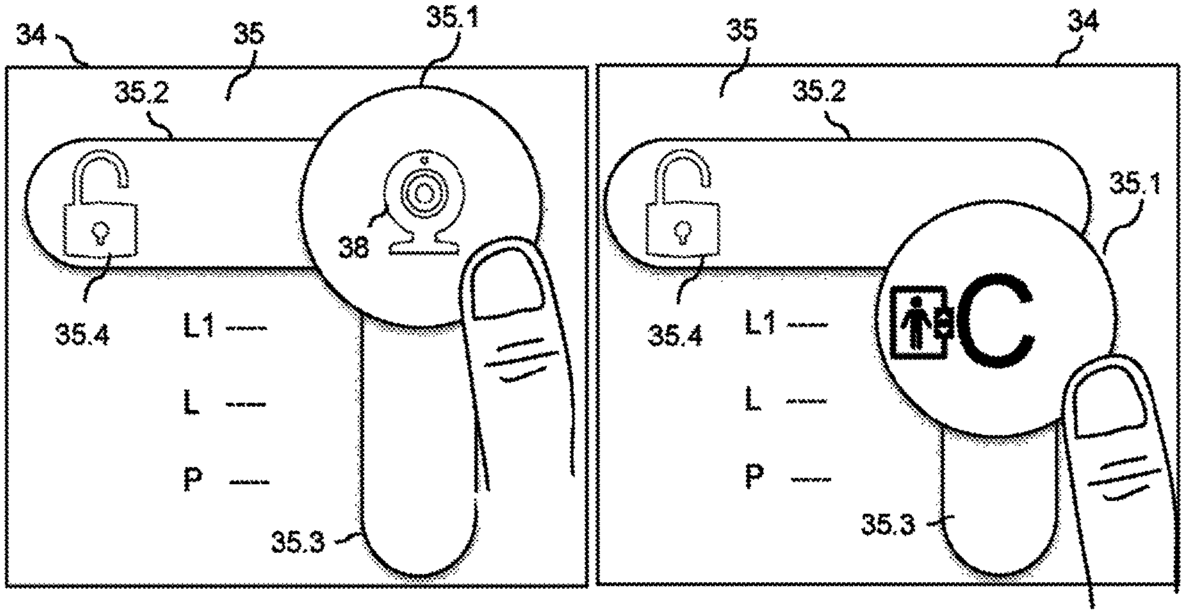
FIGS. 4A-4B show schematic diagrams of interior display examples of an exemplary embodiment of a user interface of an operating and wayfinding device of the building door system.

As explained in connection with FIG. 2, in some embodiments the operating and wayfinding device 6 comprises the display device 34, the user interface 35 of which can be viewed and operated from the interior space. FIG. 4A and FIG. 4B show schematic diagrams of internal and user interface 35 display examples of an exemplary embodiment of the display device 34. For this purpose, the display device 34 comprises a touch-sensitive screen (hereinafter also referred to as touch screen). In FIG. 4A and FIG. 4B, the user interface 35 shows a slider 35.1 which can be moved along a first (horizontal) path 35.2 and a second (vertical) path 35.3 by an indicated finger. In the exemplary embodiment shown, the paths 35.2, 35.3 extend from a common origin at right angles to one another; in FIG. 4A, the common origin is concealed by the slider 35.1. At the end of the first path 35.2, pictogram 35.4 is shown for unlocking (open padlock) or opening the door, and along the second path 35.3 exemplary floors L1, L, P are shown.

In FIG. 4A, a pictogram for the door spy (38) is shown within the circular slider 35.1. Touching or "pressing" the door spy pictogram, for example, activates the door spy (38) and the outdoor space detected by it can be displayed and observed on part of the user interface 35. If the slider 35.1 is moved along the first path 35.2 to the (unlocking) pictogram 35.4, the single-door system 2 is unlocked. Depending on the design of the single-door system 2, its door element 2*b* can be opened automatically, e.g., a sliding door can be moved from a closed position to an open position.

If, on the other hand, the slider 35.1 is moved along the second path 35.3 to a desired floor L1, L, P, an elevator call can be entered. This is represented in FIG. 4B. In this exemplary embodiment, the single-door system 2 is connected to the elevator controller 20 (FIG. 1) via the communications network 8. The elevator call thus received by the elevator controller 20 is also referred to as the destination call because it indicates both the boarding floor (location of the person 4) and the desired floor L1, L, P (destination floor). The elevator controller 20 assigns an elevator to the destination call and transmits this assignment information to the single-door system 2. In the exemplary embodiment shown in FIG. 4B, the allocation information (elevator C) is displayed within the slider 35.1. If the person 4 then leaves the interior space to go to the assigned elevator (C), they can request wayfinding information with the operating and wayfinding devices 6 arranged along the path to the elevator, if required, as described in connection with FIG. 3A-FIG. 3C.

With reference to the representations in FIG. 4A and FIG. 4B, a person skilled in the art also recognizes that these are exemplary and are not limited to the representations shown.

FIG. 5 shows exemplary signal diagrams for different application examples A1-A6 based on a single-door system 2 of the building door system 1. In each application example A1-A4, signals as a function of time t are shown schematically and not to scale for illustration and reference. FIG. 5 schematically shows the communications network 8 as units involved in the respective communication, wherein the detection device 44, the display device, the control and processing device 30 and the storage device 36 of a single-door system 2 are shown on the left thereof and wherein the building management system 22 together with the elevator controller 20 and a group of the other operating and wayfinding devices 6 and the single-door systems 2 are shown on the right thereof. A person skilled in the art will recognize that, depending on the design of the building or the building door system 1, communication can take place without any involvement of the building management system 22, the elevator controller 20 and/or the storage device 36 of the single-door system 2, as is explained below in connection with application examples A1-A4.

In application example A1, a storage device 36 is provided on the single-door system 2, in which one or more identifiers of credentials belonging to one or more persons 4 authorized to access the system are stored. The detection device 44 of the single-door system 2 (e.g., hotel room) at which the person 4 is located transmits an ID of a credential presented by the person 4 (e.g., room key) to the control and processing device 30 (signal S10). The control and processing device 30 thus controls the storage device 36 in order to check whether the identifier ID is stored on the single-door system 2 as belonging to a person 4 authorized to access (signal S11). This check provides either a positive (J) or a negative (N) result (signal S12). If the result is positive (J), the single-door system 2 is unlocked; person 4 can enter their hotel room, for example.

If the result is negative (ID: N), the control and processing device 30 of the single-door system 2 sends a request signal to the communications network 8 (signal S13), which transmits the request signal to the building management system 22 (signal S14). If the identifier (ID OK) is valid, the building management system 22 determines the associated wayfinding information (e.g., number (#) of the hotel room) and transmits this wayfinding information with a response signal (addressed to the requesting single-door system 2 (identifier)) to the communications network 8 (signal S15), which transmits the response signal to the control and processing device 30 (signal S16). The control and processing device 30 controls the display device 32 to display the wayfinding information on the user interface 33 (signal S17). In the hotel room example mentioned, person 4 can then read the correct room number; in FIG. 3A, for example, this is room "501." If the ID identifier is invalid, no wayfinding information can be determined; in this case, a corresponding error message can be transmitted to the requesting single-door system 2 and displayed there.

In an application example not shown in FIG. 5, no storage device 36 is provided on the single-door system 2. In this exemplary embodiment, the signals S11 and S12 are omitted, and the control and processing device 30 transmits the identifier ID directly to the building management system 22 with the request signal (signals S13, S14). The subsequent signals (S15-S17) correspond to those of application example A1.

In application example A2, a storage device 36 is provided on the single-door system 2, but a building management system 22 is not provided. Determining the identifier ID and checking it (signals S20-S22) is carried out as described in connection with application example A1 and the signals S10-S12 there. If the result is negative (ID: N), the control and processing device 30 of the single-door system 2 sends a request signal via the communications network 8 (signal S23) to the group of remaining single-door systems 2 (signal S24). Each of these single-door systems 2 determines whether a credential with this ID authorizes access to the corresponding single-door system 2. The single-door system 2 at which this is the case generates a response signal including associated wayfinding information (e.g., number (#) of the hotel room) and transmits this wayfinding information with the response signal (addressed to the requesting single-door system 2) to the communications network (signal S25), which transmits the response signal to the control and processing device 30 (signal S26). The control and processing device 30 controls the display device 32 to display the wayfinding information on the user interface 33 (signal S27). Depending on the configuration, only the single-door system 2 at which the ID is valid can respond, or each single-door system 2 can be configured to respond to a request signal. If no wayfinding information is received (either after a set time has elapsed or in the event of negative response signals), a corresponding error message can be displayed on the requesting single-door system 2.

Application examples A3 and A4 relate to a situation in which a person 4, before leaving the interior space, enters an elevator call to get to a desired destination and requests wayfinding information to the destination with the operating and wayfinding devices 6 arranged along the path to the elevator, as described in connection with FIG. 4B. The desired destination is assigned to an identifier ID of a credential valid for the interior space (i.e., desired destination and identifier ID form a data pair), and the information (data pair) relating to the desired destination is stored in the building management system 22 and/or in the storage device 36 of the single-door system 2. This means that the starting point (the interior space specified by the ID) and the destination are known in building door system 1. The destination information remains stored, for example, for a set period of time or until person 4 has reached the destination. This stored target information can be accessed as required. In application examples A3 and A4, the person 4 is located at an operating and wayfinding device 6 and presents their credentials at its detection device 44; for illustration purposes, it is assumed that the person 4 is not "known" at this operating and wayfinding device 6 or is not authorized to access the corresponding single-door system 2.

In application example A3, the detection device 44 detects an identifier ID of the credential presented by the person 4 and transmits the identifier ID to the control and processing device 30 (signal S30). In some embodiments, the control and processing device 30 may initiate a check of the identifier ID, as described, for example, in connection with the signals S11 and S12 of the application example A1. Due to the above assumption, the result is negative (ID: N). In this case, the control and processing device 30 generates a request signal and transmits it to the communications network 8 (signal S31). The request signal comprises the identifier ID and an identifier of the requesting operating and wayfinding device 6. The communications network 8 transmits the request signal in accordance with application example A3 to the building management system 22 (signal S32).

The desired destination assigned to the ID is stored in the building management system 22. When the building management system 22 receives the ID identifier, it determines the destination assigned to the ID identifier and generates a response signal. The response signal comprises the wayfinding information (DEST) to get from the location of the requesting operating and wayfinding device 6 to the destination. The building management system 22 transmits the wayfinding information (DEST) with the response signal (addressed to the requesting operating and wayfinding device 6) to the communications network (signal S33), which transmits the response signal to the control and processing device 30 (signal S34). The control and processing device 30 controls the display device 32 to display the wayfinding information on the user interface 33 (signal S35). In the elevator call example mentioned, the person 4 can then capture the wayfinding information, as illustrated in FIG. 3B and FIG. 3C.

In application example A4, no building management system 22 is provided, such that the control and processing device 30 communicates (directly) with the group of other operating and wayfinding devices 6 or the group of other single-door systems 2. The detection device 44 detects the ID of the credential presented by the person 4 and transmits the ID to the control and processing device 30 (signal S40). As in application example A3, a negative result (ID: N) is also present in application example A4, whereupon the control and processing device 30 generates a request signal and transmits this to the communications network 8 (signal S41). The request signal comprises the identifier ID and an identifier of the requesting operating and wayfinding device 6. The communications network 8 transmits the request signal in accordance with application example A4 to the group of the other operating and wayfinding devices 6 or the single-door systems 2 (signal S42).

Each of these single-door systems 2 determines whether time-valid target information is available for this identifier ID. The single-door system 2 at which this is the case generates a response signal including associated wayfinding information based on the location of the requesting operating and wayfinding device 6 and transmits this wayfinding information with the response signal (addressed to the requesting operating and wayfinding device 6) to the communications network (signal S43), which transmits the response signal to the control and processing device 30 (signal S44). The control and processing device 30 controls the display device 32 to display the wayfinding information on the user interface 33 (signal S45).

In order to determine the wayfinding information in accordance with application examples A3 and A4, the operating and wayfinding devices 6 and/or the building management system 22 can access a layer and building plan defined and stored for the building, for example, with a search query in a database facility (e.g., route from location to destination). In a location and building plan of a building, for example, the spaces, corridors, halls, stairs, elevators and/or escalators can be shown to scale for each floor. The location and building plan may be stored in a storage device provided for this purpose, which may, for example, be arranged in the building management system 22. In some embodiments, each of the operating and wayfinding devices 6 may have or be connected to such a storage device.

The invention claimed is:

1. A building door system comprising at least one operating and wayfinding device, each of which is associated with and communicatively connectable to a single-door system by a communications network, each operating and wayfinding device comprising:

- a storage device configured to store an identifier of the operating and wayfinding device;
- a control and processing device connected to the storage device;
- a detection device communicatively connected to the control and processing device configured to detect a credential of a person; and
- a display device communicatively connected to the control and processing device comprising a user interface facing an outdoor space which is configured to be viewed by the person located in the outdoor space, wherein the control and processing device is configured to:

- based on a determination that the credential of the person is valid at the single-door system, permit access to the single-door system, and
- based on a determination that the credential of the person is invalid at the single-door system:
  - generate a request signal with the credential of the person and the identifier of the operating and wayfinding device,
  - transmit the request signal over the communications network,
  - receive a response signal, responsive to the request signal, via the communications network,
  - extract wayfinding information contained in the response signal and assigned to the credential of the person, and
  - control the display device to display the wayfinding information on the user interface.

2. The building door system of claim 1, further comprising multiple single-door systems which are communicatively coupled to the communications network, wherein each single-door system comprises a frame which is configured to be installed in a building wall, and a door element which is movably arranged therein, which, when in an open state, is configured to release a passage between the outdoor space and an interior space and, when in a closed state, blocks the passage, and a closing device which is communicatively connected to the control and processing device.

3. The building door system of claim 1, wherein at least one single-door system comprises a single-action door or a sliding door.

4. The building door system of claim 1, wherein the single-door system comprises an interface device configured to transmit the request signal to a building management system via the communications network and to receive the response signal from the building management system via the communications network, wherein the building management system is configured to determine the wayfinding information.

5. The building door system of claim 1, wherein the single-door system comprises an interface device which is configured to transmit the request signal to further single-door systems via the communications network and to receive the response signal via the communications network from one of the further single-door systems to which the credential is assigned and which determines the wayfinding information.

6. The building door system of claim 1, wherein the display device of each operating and wayfinding device is arranged on a door element, a frame of the single-door system, or on a building wall at a fixed distance from the frame of the single-door system.

7. The building door system of claim 1, wherein at least one of the at least one operating and wayfinding device further comprises a further display device which is communicatively connected to the control and processing device and comprises a user interface facing an interior space, wherein the user interface can be viewed and/or operated by a person who is located in the interior space.

8. The building door system of claim 1, wherein the at least one operating and wayfinding device comprises an optical system, wherein the optical system is configured to generate an image recording of the outdoor space.

9. The building door system of claim 7, wherein the storage device of each operating and wayfinding device is configured to store destinations which can be reached by a person in a building with the building door system, wherein the control and processing device is configured to control the further display device to display at least one of the destinations for a destination input, and wherein the storage device is configured to store the destination input.

10. The building door system of claim 9, wherein the control and processing device is configured to transmit the destination input via the communications network to an elevator controller, to receive an elevator allocation determined by the elevator controller via the communications network and to control the further display device to display the elevator allocation.

11. The building door system of claim 2, wherein at least one single-door system comprises a single-action door or a sliding door.

12. The building door system of claim 2, wherein the single-door system comprises an interface device configured to transmit the request signal to a building management system via the communications network and to receive the response signal from the building management system via the communications network, wherein the building management system is configured to determine the wayfinding information.

13. The building door system of claim 2, wherein the single-door system comprises an interface device which is configured to transmit the request signal to further single-door systems via the communications network and to receive the response signal via the communications network from one of the further single-door systems to which the credential is assigned and which determines the wayfinding information.

14. The building door system of claim 2, wherein at least one of the at least one operating and wayfinding device comprises a further display device which is communicatively connected to the control and processing device and comprises a user interface facing the interior space, wherein the user interface can be viewed and/or operated by a person who is located in the interior space.

15. The building door system of claim 2, wherein the at least one operating and wayfinding device comprises an optical system, wherein the optical system is configured to record the credential.

16. The building door system of claim 3, wherein the single-door system comprises an interface device configured to transmit the request signal to a building management system via the communications network and to receive the response signal from the building management system via the communications network, wherein the building management system is configured to determine the wayfinding information.

17. A method of operating the building door system of claim 1, comprising:

detecting the credential of the person by the detection device of the at least one operating and wayfinding device of the single-door system, and based on a determination that the the credential is invalid at the single-door system:

generating the request signal by the control and processing device of the at least one operating and wayfinding device, wherein the request signal comprises the credential of the person and the identifier of the operating and wayfinding device;

feeding the request signal into the communications network by the control and processing device;

receiving the response signal via the communications network by the control and processing device;

extracting the wayfinding information contained in the response signal and associated with the credential by the control and processing device; and controlling the display device of the at least one operating and wayfinding device to display the wayfinding information on the user interface of the display device.

18. The method of claim 17, wherein feeding the request signal into the communications network comprises transmitting the request signal to a building management system, and wherein the control and processing device receives the response signal from the building management system configured to determine the wayfinding information.

19. The method of claim 17, wherein feeding the request signal into the communications network comprises transmitting the request signal to further single-door systems, and wherein the control and processing device receives the response signal from one of the further single-door systems to which the credential is assigned and by which the wayfinding information is determined.

* * * * *